United States Patent [19]

Ariga et al.

[11] Patent Number: 4,718,101
[45] Date of Patent: Jan. 5, 1988

[54] IMAGE PROCESSING SEGMENTATION APPARATUS

[75] Inventors: Makoto Ariga, Yokohama; Seiji Hata, Fujisawa; Yoshikazu Suzumura, Chofu; Masaaki Nakagima, Hitachi; Michio Takahashi, Yokohama, all of Japan

[73] Assignee: Hitachi, Ltd., Tokyo, Japan

[21] Appl. No.: 714,795

[22] Filed: Mar. 22, 1985

[30] Foreign Application Priority Data

Mar. 26, 1984 [JP] Japan ................................ 59-56046

[51] Int. Cl.$^4$ ............................................. G06K 9/34
[52] U.S. Cl. ........................................... 382/9; 382/26
[58] Field of Search ................. 382/8, 9, 27, 28, 26, 382/56; 358/106; 364/518

[56] References Cited

U.S. PATENT DOCUMENTS

| | | | |
|---|---|---|---|
| 4,189,711 | 2/1980 | Frank | 340/146.3 |
| 4,408,342 | 10/1983 | Grabowski et al. | 382/9 |
| 4,543,659 | 9/1985 | Ozaki | 382/8 |
| 4,624,013 | 11/1986 | Urushibata | 382/9 |

OTHER PUBLICATIONS

L. M. Ni et al, IBM TDB, vol. 26, No. 10B, Mar. 1984, pp. 5481–5482.

Primary Examiner—David K. Moore
Assistant Examiner—Jacqueline Todd
Attorney, Agent, or Firm—Fay, Sharpe, Beall, Fagan, Minnich & McKee

[57] ABSTRACT

A segmentation apparatus utilized in an image processing system for recognizing a pattern in an image inputted thereto includes a separate circuit for outputting logical values of m by n pixels separated from the inputted image, an encode circuit for storing in advance therein codes to be determined according to the content of an inputted pattern and for outputting a code indicating that which set of pixels is identical to the objective pixel by using as an input pattern the logical value outputted from the separate circuit, and a select circuit for selecting a label of the objective label, from the label data of neighborhood pixels already determined and the new label data assigned, in accordance with the output from the encode circuit.

5 Claims, 31 Drawing Figures

FIG. 3A

○ : PIXEL UNDER DISCRIMINATION

| | PATTERN | |
|---|---|---|
| NEW LABEL | ※ 0 ※ / 0 ① 0    ※ 0 0 / 0 ① ※ | ※ 1 ※ / 1 ⓞ 1    ※ 1 1 / 1 ⓞ ※ |
| CONFLUENCE | ※ 1 0 / 0 ⓞ 0 | ※ 0 1 / 1 ① 1 |
| EXISTING LABEL — Bw2 SIDE | ※ 0 ※ / ※ ⓞ ※ | ※ 1 ※ / ※ ① ※ |
| EXISTING LABEL — Bx SIDE | ※ 1 1 / 0 ⓞ ※    ※ 1 ※ / 0 ⓞ 1 | ※ 0 0 / 1 ① ※    ※ 0 ※ / 1 ① 0 |
| EXISTING LABEL — Bw3 SIDE | ※ 0 1 / 0 ① 1 | ※ 1 0 / 1 ⓞ 0 |

FIG. 3B

| Bw1 | Bw2 | Bw3 |
|---|---|---|
| Bx | Bf | By |

FIG. 3C

| Lw1 | Lw2 | Lw3 |
|---|---|---|
| Lx | Lf | |

FIG. 4

FIG. 5A
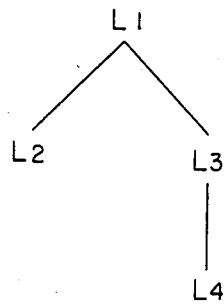
FIG. 5B
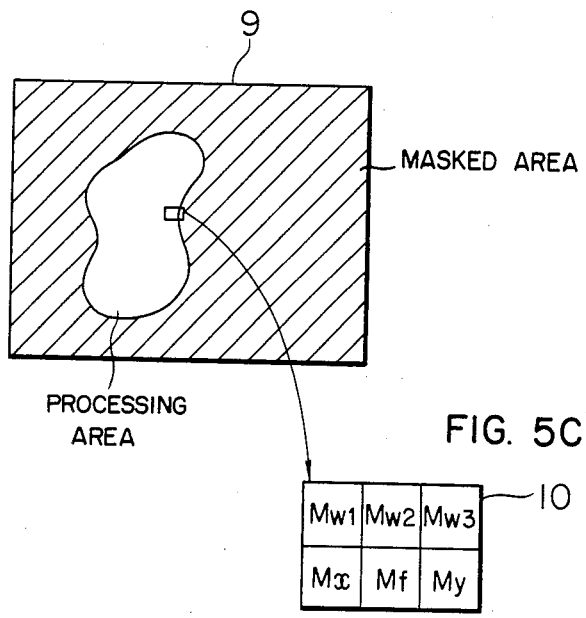
FIG. 5C

FIG. 6A
○ : PIXEL UNDEL DISCRIMINATION
| | PATTERN | MASK PATTERN |
|---|---|---|
| NEW LABEL | | |
| CONFLUENCE | | |
| EXISTING LABEL — Bw2 SIDE | | |
| EXISTING LABEL — Bx SIDE | | |
| EXISTING LABEL — Bw3 SIDE | | |
| NO LABEL | | |
FIG. 6B
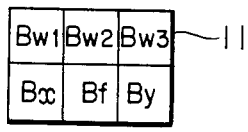
FIG. 6C
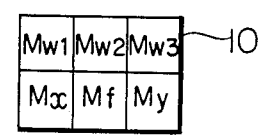

FIG. IIA

| PROCESSING MODE | | OUTPUT FROM ENCODER | | | | |
|---|---|---|---|---|---|---|
| | | D0 | D1 | D2 | D3 | D4 |
| NEW LABEL ASSIGN | | 1 | 0 | 0 | 0 | 0 |
| LABEL CONFLUENCE | Bw2 | 0 | 1 | 0 | 0 | 0 |
| EXISTING LABEL ASSIGN | Bx | 0 | 0 | 1 | 0 | 0 |
| | Bw3 | 0 | 0 | 0 | 1 | 0 |
| | | 0 | 0 | 0 | 0 | 1 |

FIG. 11B

| | INPUT | | | | | | | | | | | | | | | OUTPUT | | | | | PROCESSING MODE |
|---|---|---|---|---|---|---|---|---|---|---|---|---|---|---|---|---|---|---|---|---|---|
| | Mw1 | Mw2 | Mw | Mx | Mf | My | Bw1 | Bw2 | Bw3 | Bx | Bf | By | D0 | D1 | D2 | D3 | D4 | |
| 1 | O | O | O | O | O | O | O | O | O | O | O | — | O | O | — | O | O | LABEL ON Bw2 SIDE |
| 2 | O | O | O | O | O | O | O | O | O | O | — | O | — | O | — | O | O | NEW LABEL |
| 3 | O | O | O | O | O | O | O | O | O | O | — | — | — | O | O | O | O | NEW LABEL |
| 4 | O | O | O | O | O | O | O | O | O | — | O | O | O | O | — | O | O | LABEL ON Bw2 SIDE |
| 5 | O | O | O | O | O | O | O | O | O | — | O | — | O | O | — | O | O | LABEL ON Bw2 SIDE |
| 6 | O | O | O | O | O | O | O | O | O | — | — | O | O | O | O | — | O | LABEL ON Bx SIDE |
| 7 | O···O | O···O | O···O | O···O | O···O | O···O | O···— | —···O | O···O | —···O | —···O | —···O | O···O | O···— | O···O | O···O | O···O | LABEL ON Bx SIDE / CONFLUENCE |
| | O | O | O | O | O | O | O | O | O | O | O | — | O | O | — | — | O | LABEL ON Bx SIDE |
| | O | O | O | O | O | O | — | — | O | O | — | O | O | O | — | O | O | LABEL ON Bw2 SIDE |
| | O | O | O | O | O | O | — | — | O | O | — | — | O | O | — | O | O | LABEL ON Bw2 SIDE |
| | --- | --- | --- | --- | --- | --- | --- | --- | --- | --- | --- | --- | --- | --- | --- | --- | --- | |
| | O | — | O | — | O | O | O | O | O | O | O | — | O | O | — | O | O | LABEL ON Bw2 SIDE |
| | O | O | O | O | O | O | O | O | O | — | — | O | — | O | O | O | O | NEW LABEL |
| | O | O | — | — | O | O | O | O | O | — | — | — | — | O | O | O | O | NEW LABEL |
| | — | — | O | O | O | O | O | O | O | — | O | O | O | O | O | O | — | LABEL ON Bw3 SIDE |
| | O | O | O | — | O | O | O | O | O | — | O | — | — | O | O | O | O | NEW LABEL |

$2^{12}$

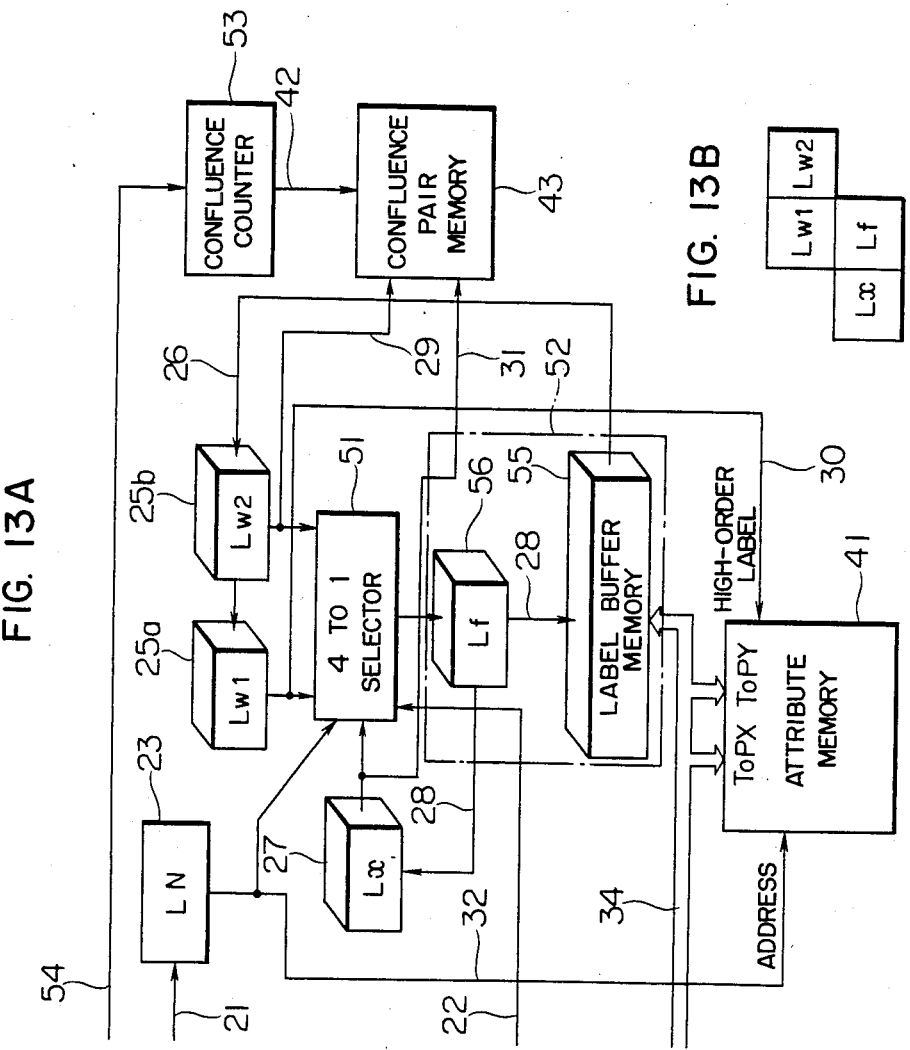

IMAGE PROCESSING SEGMENTATION APPARATUS

BACKGROUND OF THE INVENTION

The present invention relates to the pattern recognition technology, and in particular, to an image processing segmentation apparatus suitable for recognizing the number of images in pattern recognition, for labelling each image, for detecting the area of each label, for calculating top or vertex coordinates, and for determining nesting relationships between images.

In the segmentation processing, it has been conventionally well known that the image elements or components (an image component is a set or assembly of pixels, e.g. pixels defined by logic "1" or "0" in a binary image and being connected to each other by the proximate, same logic (i.e. "1" or "0") relation) existing in an image 1 as depicted in FIG. 1A are labelled as L1, L2, L3, and L4 as shown in an image 2 of FIG. 1B in the same manner for sequentially numbering the elements; furthermore, the number of the labelled elements, the area of each labelled image element, and the like are recognized, thereby segmenting areas of an image. Image processing can be utilized in various industrial fields.

In such a processing, a binary image memory 4 for storing binary image signal 3 and a label image memory 5 for storing the contents obtained by labeling the binary image signal 3 are conventionally utilized as illustrated in FIG. 2A. These memory units are configured so that data therein can be directly read through a bus 6 by a central processing unit (CPU) 7. As shown in FIG. 2B, m by n pixels in the vicinity of an objective pixel f(i, j) are identified and fetched from the binary image memory 4 by a software processing in accordance with the contents of a program beforehand stored in a program memory 8. At the same time, the contents of labeled pixels in the vicinity of F(i, j) corresponding to f(i, j) are identified and fetched from the label image memory 5 as shown in FIG. 2C. F(i, j) is labeled according to the contents of the binary image element comprising m×n fetched pixels and to those of the labels assigned to the pixels in the vicinity thereof, thereby storing the resultant data in the label image memory 5.

Consequently, above processing entirely depends on the software processing, hence a great amount of memory areas such as program, image, and work memory areas are necessary and a considerable number of calculation processing is required, resulting in a long recognition time. This leads to drawbacks such that the size of recognition apparatus is increased and the cost required is soared, hence such a recognition procedure can not be practically utilized.

SUMMARY OF THE INVENTION

It is therefore an object of the present invention to provide a segmentation apparatus of a higher recognition speed.

Another object of the present invention is to provide a compact, economical segmentation apparatus constructed in a simple circuit configuration.

Still another object of the present invention is to provide a segmentation apparatus which can perform a realtime processing of the operations such as labeling images, counting the number of labels, calculating label area, and recognizing top coordinates of labels and nesting relationships between images.

A further object of the present invention is to provide a segmentation apparatus which is capable of performing hardwarewise segmentation in an area having an arbitrary shape.

A further object of this invention is to provide an automated system provided with visual recognition.

Conventionally, the labeling in segmentation processing has been softwarewise conducted by identifying m by n pixels in the vicinity of an objective pixel along a direction in which the line scanning is performed on the image. The labeling procedure will be described. A portion of image is separated in the form of 3 by 2 pixel units as shown in FIG. 3A. First of all, assume that the binary image memory 4 of FIG. 2A is named as B and that the objective pixel $Bf=B(i, j)$ and pixels to be fetched around Bf are $BW_1=B(i-1, j-1)$, $BW_2=B(i, j-1)$, $BW_3=B(i+1, j-1)$, $B_x=B(i-1, j)$, and $B_y=B(i+1, j)$, respectively as depicted in FIG. 3B. All the fetched pixels are not always utilized for segmentation. As shown in FIG. 3C, a label data image comprising 3 by 2 pixels are correspondingly separated from the label image memory 5 of FIG. 2A at the same time. Naturally, labels are given only to the already-scanned pixels. Assume that the pixel to be labeled is $Lf=L(i, j)$ and that the pixels already labeled are $LW_1=L(i-1, j-1)$, $LW_2=L(i, j-1)$, $LW_3=L(i+1, j-1)$, and $L_x=L(i-1, j)$.

Under these circumstances, an objective binary image pixel can be logically classified as follows by examining the neighboring pixels to determine whether or not they are linked to each other in accordance with the logic of "0" or "1": The first pattern (assigning a new label) in which the objective pixel is defined as a new label because the pixels are not linked to the labelled neighboring pixels as depicted in FIG. 3A, the second pattern (confluence) in which the label assigned to $LW_3$ is different from that assigned to $L_x$ although the logic of $LW_3$ is identical to the logic of $L_x$ when the logic of $BW_3$, $B_y$, Bf, and $B_x$ are linked and the logic of $BW_2$ is different therefrom, and the third pattern (assigning an existing or old label) in which an existing label of $LW_2$, $LW_3$, or $L_x$ is assigned to the objective pixel. In the above example, the logic and label of (i−1, j−1) pixel ($BW_1$ and $LW_1$) are not considered. FIG. 4 illustrates the labels obtained by labeling the image of FIG. 1A according to the labeling logic of FIG. 3A. It may be seen that the straight downward connection is first considered, downward and backward connection is then considered and horizontal forward connection is finally considered in this example. As a result, the pixels are actually labeled with up to label number 10 although the image has only four components because the portions of image are separated in 3 by 2 pixel units. In this case, however, if the logic of confluence described in conjunction with FIG. 3A is utilized, the relationships such as $l_2=l_3$, $l_3=l_4$, $l_1=l_6$, $l_6=l_7$, $l_1=l_7$, $l_5=l_8$, and $l_5=l_9$ (l means preliminary or intermediate label) are obtained in the labeling process. A further rule that a smaller number of label has priority may be used of as marked with a small circle (o) in FIG. 4. Linking the connected components (labels), the final labels L are obtained as represented in expression (1), so the label image of FIG. 4 can be labeled as shown in FIG. 1B.

$$\left.\begin{array}{l} L1: l_1 = l_6 = l_7 \\ L2: l_2 = l_3 = l_4 \\ L3: l_6 = l_3 = l_4 \\ L4: l_{10} \end{array}\right\} \quad (1)$$

The present invention provides a method for implementing the image data processing by use of a hardware system and for performing a realtime processing at a high speed. In addition, the present invention is characterized in that several characteristic data items for a labeling operation can be also processed during the labeling operation. An automated system such as a robot can be controlled by the result of image recognition.

First of all, when the labeling of FIG. 4 is performed, the coordinate (x, y) of a pixel at which a new label is given is detected and defined as top coordinates (TOP.X, TOP.Y) of the label, and the label of coordinates expressed by ($X_p$=TOP.X, $Y_p$=TOP.Y$-$1) with respect to the detected top coordinates are detected and defined as a high-order or upper label to the new label. When integrating the labels, if the high-order labels are also integrated in conformity with the label confluence relationships, the image components after the labeling operation are represented as a tree structure of FIG. 5A which indicates that the image components of labels L2 and L3 are included in the image of label L1 and that the image component of label L4 is included in the image of label L3. Consequently, the image configuration such as shown in FIG. 1B can be recognized by use of the coordinate (TOP.X, TOP.Y) of each label image and the tree structure. Other parameters such as contour, area, center of gravity (area), nearest and farthest points of contour, angles about the center of gravity can be determined.

Next, since the conventional labeling process is conducted by using a rectangular operator consisting of m by n pixels, the processing range is limited to the inside of a rectangle formed by I×J pixels. To remove this restriction, the present invention allows the labeling process to be carried out in an area having an arbitrary shape at a desired location in the image. In this respect, U.S. patent application Ser. No. 659,175 filed on Oct. 9, 1984 by Ariga et al. is referenced. To achieve this object, a mask image 9 having an arbitrary shape is prepared in advance as illustrated in FIG. 5B, and an m by n pixel unit 10 in the mask image associated with the coordinate of the binary image is fetched from this mask image as shown in FIG. 5C simultaneously with fetching of the binary image unit. By conducting the logic operation between the fetched pattern of the binary image and the fetched mask image pattern, the labeling process can be executed for any mask shape in the m by n pixel range. FIG. 6A depicts a pattern of a logical range in which the mask pattern 10 operates for the logic associated with a binary pattern 11. This is an example of labeling logic in which the mask pattern corresponding to the logic "1" prevents the corresponding binary image pixel from being referenced. Asterisk symbol * indicates "don't care". If the labeling process is conducted according to this logic when the shade portion is masked as illustrated in FIG. 7, the processing is carried out only in the unmasked portion with labels assigned up to label number 8, which is different from the result of FIG. 4. Expression (2) is obtained by conducting the integration processing on this masked result. In this case, the number of labels is three. Symbols ML and ml indicate "masked final and intermediate labels".

$$\left.\begin{array}{l} ML1: ml_1 = ml_2 = ml_3 = ml_4 \\ ML2: ml_5 = ml_6 = ml_7 \\ ML3: ml_8 \end{array}\right\} \quad (2)$$

The image structure can be recognized in which ML1 includes ML2, which further includes ML3.

Above-mentioned labeling operation is quite effective when a range enclosed by curves is required to be established, for example, to prevent disturbances such as noise which may affect the recognition or to subdivide the image range in advance, that is, the pattern recognition processing can be utilized in the wider application areas.

In addition, this process may include detection of the area of the labeled image. For this purpose, if the labeling operation is carried out as shown in FIG. 7, the accumulated value is detected for each label when the label is assigned, and the area for each label can be recognized by adding the accumulated value of each label based on the integration relationships represented by expression (2).

As described above, the hardwarewise segmentation is performed in an area having an arbitrary shape by use of a mask image pattern, which enables to execute a realtime processing of the image characteristic data such as the labels, the number of labels (equal to that of the image components), area of a labelled region, top coordinates of a labelled area, and nest relationships between image components.

BRIEF DESCRIPTION OF THE DRAWINGS

FIG. 3A to FIG. 3C are schematic diagrams illustrating label operators for explaining the labelling procedure in accordance with the present invention.

FIG. 4 depicts a label image.

FIG. 5A to FIG. 5C are diagrams illustrating the image tree structure and mask images, respectively.

FIG. 6A to FIG. 6C are schematic diagrams depicting label operators to be used for the mask pattern operation.

FIG. 10 is a schematic block diagram depicting an embodiment of the operator separate circuit of FIG. 9.

FIG. 11A and FIG. 11B are diagrams for illustrating the data structure of the encode circuit for the labelling operation of FIG. 9.

FIG. 13A and FIG. 13B are block diagrams illustrating examples of the label image separate circuit and its peripheral circuits of FIG. 9.

DESCRIPTION OF THE PREFERRED EMBODIMENT

The present invention will be described in detail by referring to FIG. 9 to FIG. 16.

Figure 1A:
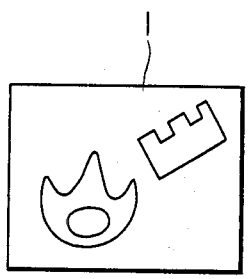
FIG. 1A and FIG. 1B are schematic diagrams for explaining a labelling image.
Figure 1B:
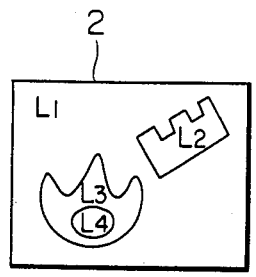
Figure 2A:
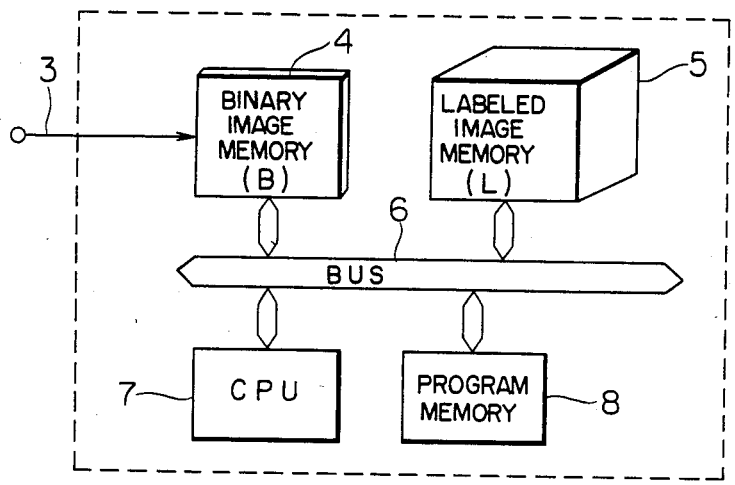
FIG. 2A to FIG. 2C are diagrams illustrating the configuration of the image processing apparatus and the contents of separated image elements.
Figure 2B:
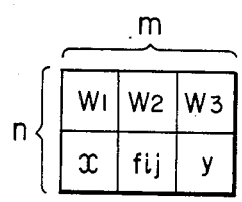
Figure 2C:
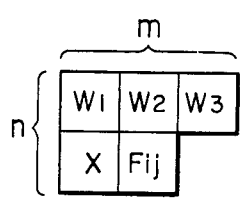
Figure 7:
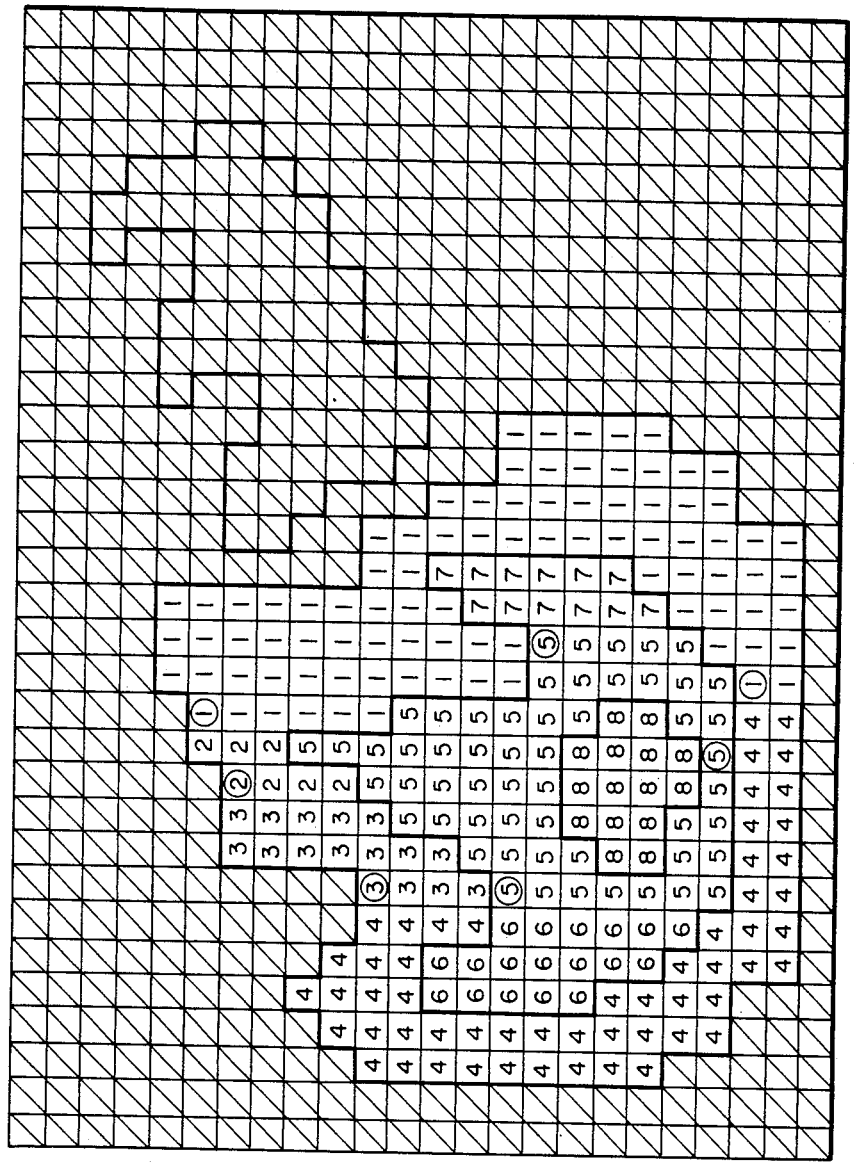
FIG. 7 illustrates a label image to be used for the mask pattern operation.
Figure 8:
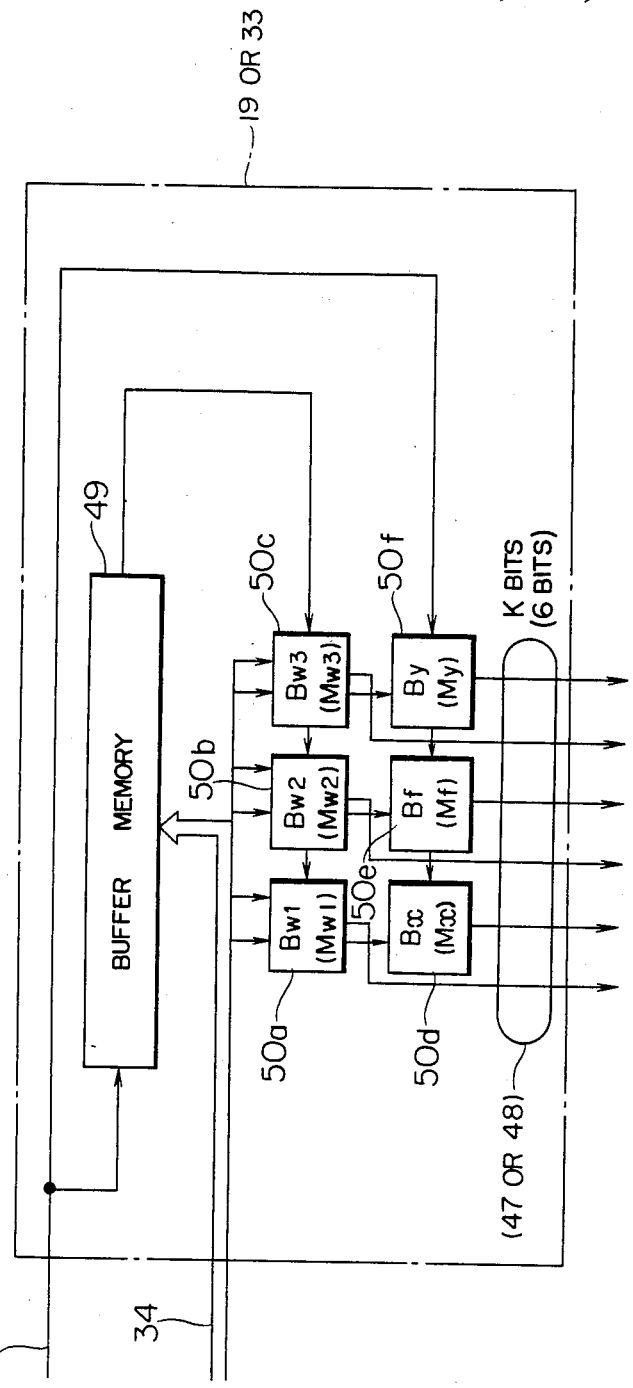
FIG. 8 outlines the characteristic data of an image.
Figure 9:
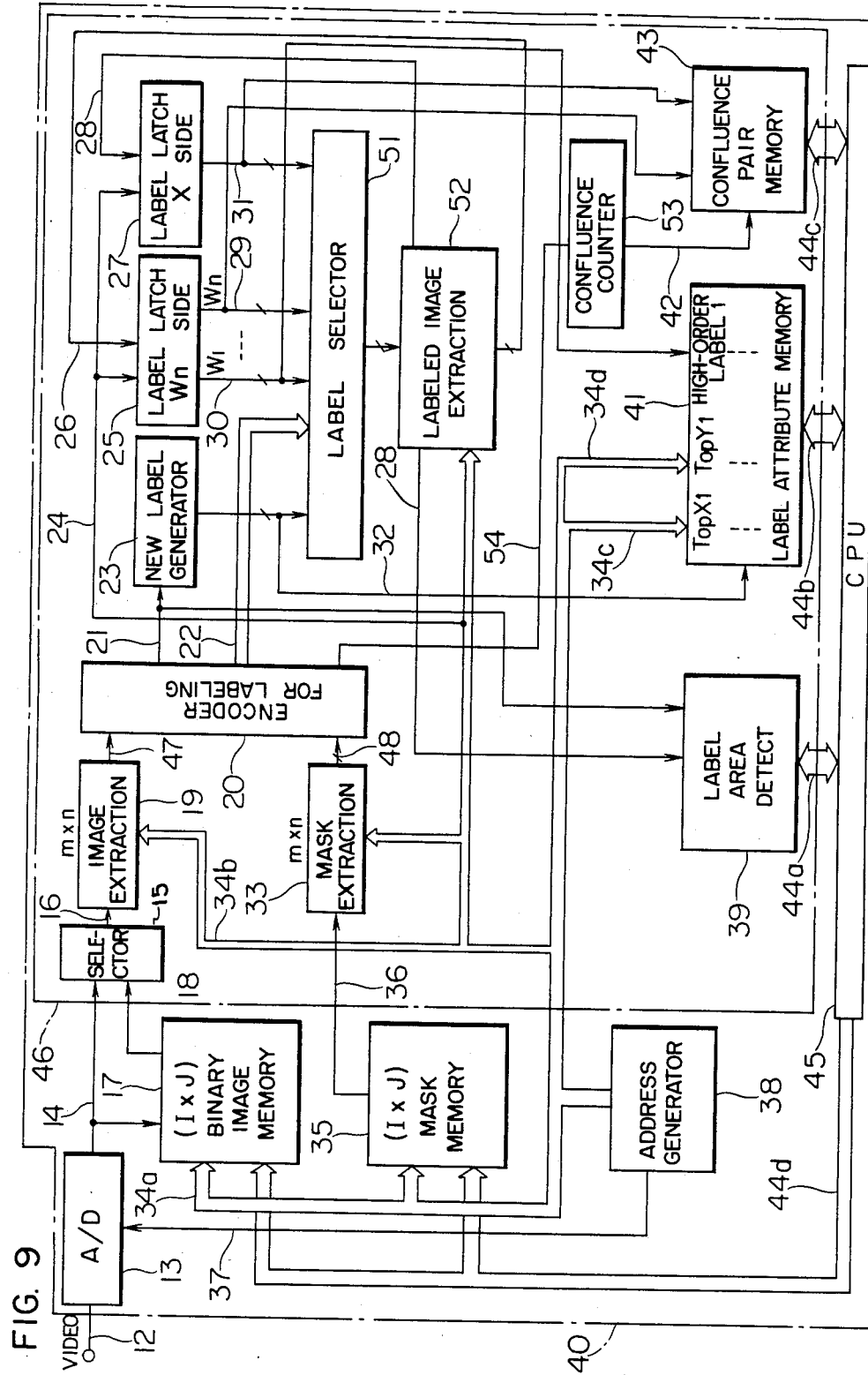
FIG. 9 is a block diagram demonstrating an embodiment of the segmentation apparatus in accordance with the present invention.

As illustrated in FIG. 9, when a video signal 12, e.g. video scan signal from an industrial TV camera, is applied to an A/D converter 13 in synchronism with a segmentation apparatus 40, an A/D conversion is performed on the video signal 12 by the A/D converter by use of a sampling clock 37 supplied from an image address generator 38 according to a preset threshold level, thereby obtaining a digital image signal 14, e.g. a binary signal. The binary signal 14 is supplied to a selector 15 and a binary memory 17. Although the binary memory 17 may be dispensed with, this embodiment allows a CPU 45 to read the contents of the binary memory 17 through a CPU bus 44d, thereby improving the applicability of the processing. In this operation, the binary memory 17, a mask memory 35, and the inputted video signal 12 are synchronized with an address signal 34a from the image address generator 38 so that the positional relationships between signals are geometrically retained during the operation. The binary memory 17 and the mask memory 35 are so configured as to be respectively accessed by internally changing over the image address signal 34a according to an instruction signal supplied from the CPU 45 via the CPU bus 44d. On receiving the signal, the selector circuit 15 changes over between "the inputted" binary signal 14 and a binary signal 18 from the binary memory 17 so as to select a case in which the segmentation is carried out when the input is supplied and a case in which a signal stored in the memory is processed. It will be obvious that other signals such as color image signals can be employed in similar manners.

In order to perform a segmentation processing (more concretely, a labelling operation), the binary signal 16 and a mask signal 36 each synchronized with the address signal 34b from the image address generator 38 are processed in a binary image extraction circuit 19 and a mask image extraction circuit 33, respectively so as to extract the binary operator 11 and the mask operator 10, signals 47, 48 respectively, as shown in FIG. 6. These extraction circuits can extract the operators in similar manners. A 3 by 2 operator extraction will be described by referring to FIG. 10. The input binary signal 16 or mask signal 36 is stored in a buffer memory whose memory size is one scanning line, and at the same time, it is latched in a shift register 50f for an extraction operation. Immediately before "a" new data is stored in the buffer memory 49, "a" binary or mask data at the same address delayed in time by one scanning line is read and latched in a shift register 50c. Thus, the data in register 50 are successively shifted. Consequently, the buffer memory 49 operates according to the x address of the address signal 34b and the latch 50 performs the latch operation by shifting its signal in accordance with the timing of the lower-most value of the x address. The m by n pixel data separation is thus performed to obtain a logic signal 47 or 48 for the labelling operation. As depicted in FIG. 9, the labelling operation is performed by executing the logical judgment in accordance with the "new label assignment", "label confluence", and "existing label assignment" patterns shown in FIG. 6. Although six bits are used for a labelling logic in this embodiment, the logical variable may be arbitrarily determined to be represented by an arbitrary number (k) of bits for the labelling process.

Next, an encode circuit 20 for generating codes for the labelling operation will be described. The codes for the labelling operation are processed by use of a memory configuration enabling a 2 by k bit addressing with a 2 by k bit input signal in which the code data is beforehand written at an address indicated by the state of the input signal.

The data structure and the circuit configuration of the encoder 20 when a 3 by 2 pixel extraction is adopted will be described. For the operation patterns shown in FIG. 6A and FIG. 6B, the output data from the encoder 20 is assumed to comprise five bits as depicted in FIG. 11A. The positive signal "1" is regarded as a control signal to be produced. Although the output comprises five bits $D_0$ to $D_4$ in FIG. 11A, it need not be limited by this output pattern but it may be arbitrarily determined depending on the configuration of the subsequent circuit stage to be controlled by the encoder output data.

When the all the control patterns of the processing mode, e.g. new label assignment, label confluence, and existing label assignment, are determined in advance, the output signals can be simulated for all $2^{12} = 4096$ kinds of patterns obtained by the combinations of the 12-bit data comprising the mask data ($MW_1$ to $MW_3$, $M_x$, $M_f$, $M_y$) and the image data ($BW_1$ to $BW_3$, $Bx$, $Bf$, $By$) utilized as input signals for the encoder 20 as illustrated in FIG. 11B. In the above described example, bits $BW_1$, $MW_1$ are not considered and then the number of patterns decreases to $2^{10} = 1024$. Consequently, if the addresses and data of the memory circuit are preliminarily related as shown in FIG. 11B so as to be accessed by an address comprising the 12 bits of the mask and image data information, and to produce a control code ($D_0$ to $D_4$) beforehand simulated for the labelling operation, the control data for the labelling operation can be outputted at a high speed for any given mask and image data patterns. Namely, encoder 20 may be formed of a memory which contains a table as shown in FIG. 11B, when an address is assigned, an associated data is outputted.

Figure 12A:
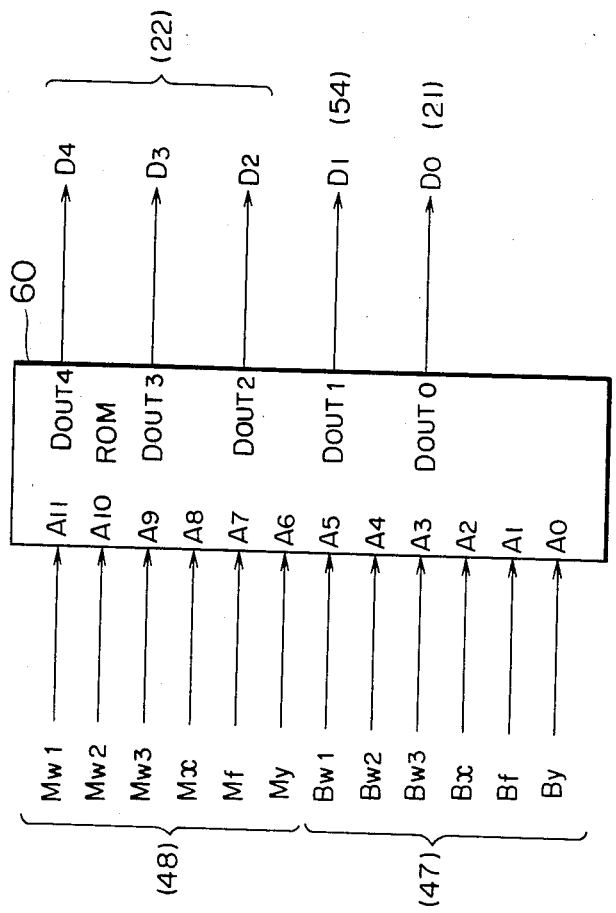
FIG. 12A and FIG. 12B are block diagrams illustrating examples of encode circuit configuration of FIG. 9.
Figure 12B:
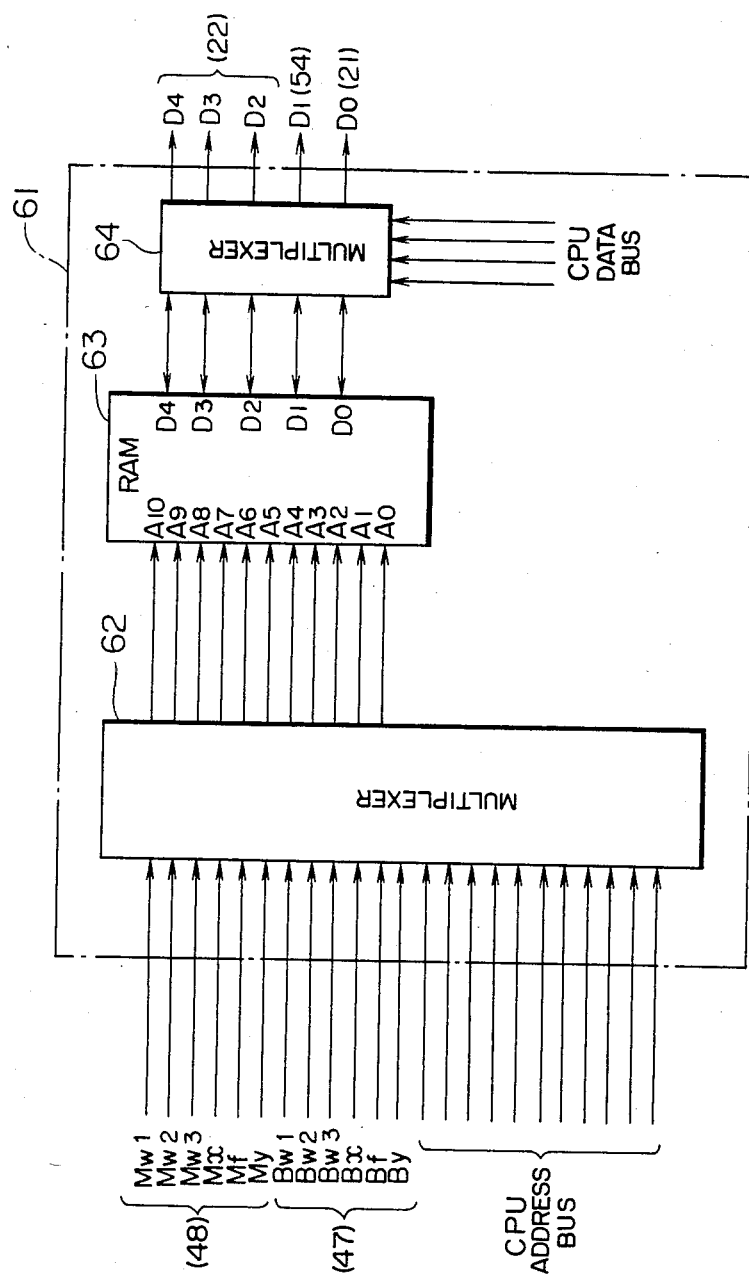

As for the circuit configuration of this system, the simulated data can be stored in a read only memory (ROM) 60 as illustrated in FIG. 12A, or the labelling code may be written in a random access memory 63, disposed in a RAM section 61 and provided with multiplexers 62 and 64, from the CPU 45 of the image processing system as depicted in FIG. 12B. In accordance with this method, the hardware size can be reduced as compare with a system utilizing a gate circuit to generate the labelling codes. Although the operation patterns for the labelling process has been described referring to FIG. 6, different operation systems are also applicable, for example, the mask pattern may be dispensed with. When changes in operation conditions are desired, only the code data may be altered to effect such changes, and the preceding and succeeding stages of circuit configuration need not be changed. In addition, the timing control can be implemented in a considerably simple manner.

In FIG. 12A and FIG. 12B, the input signals BW$_1$, BW$_2$, BW$_3$, Bx, Bf, and By and the input signals MW$_1$, MW$_2$, MW$_3$, Mx, Mf, and My correspond to the signals 47 and 48, respectively of FIG. 9. The output signals D$_0$, D$_1$, and D$_2$ to D$_4$ correspond to the new label generate signal 21, the label confluence signal 54, and the labelling (old label) code 22, respectively of FIG. 9.

As described above, the encoder 20 for the labelling operation outputs the labelling code (D$_0$, D$_3$, D$_4$) 22, the new label generate signal (D$_0$) 21 indicating a new label creation, and the label confluence signal (D$_1$) 54 indicating a label confluence in response to the logic signals 47 and 48 (B-, M-) serving as the address data. The labelling code 22 is supplied to a label selector 51 in order to label the objective pixel according to the content of the code. A new-label generator 23 causes a counter to operate by use of the new label generate signal 21 outputted from the encode circuit 20 so as to output a new (incremented) label number to the label select circuit 51. The label information delayed in time by one scanning line may be obtained as follows: the label information obtained from a label extraction circuit 52 is latched in a label latch 25 on the Wn bit side, information about n pixels in the neiborhood of the objective pixel is stored, and the oldest label information is outputted to the label select circuit 51. The neighboring label on the X bit side determined by a preceding processing ahead in time by one clock is obtained by storing the label signal in a label latch 27 on the X bit side and then outputting the stored label to the label selector 51. The labelling operation for the extraction of 3 by 2 pixel size will be described by referring to FIG. 13A and FIG. 13B. As depicted in FIG. 13A, an existing label LW$_1$, LW$_2$, or Lx or a new label LN is assigned to an objective pixel Lf. The 4-to-1 selector 51 selects of these labels according to the content of the labelling code 22 (or new label signal) and writes the selected label in a register Lf 56. After the register Lf 56 is thus set, the content thereof is written in the register Lx 27 and a label buffer memory 55. At the same time, the label buffer memory 55 reads the label data stored ahead in time by one scanning line immediately before the Lf content is written and writes the fetched data in a register LW$_2$ 25B as an information for labelling the next pixel. A shift register LW$_1$ 25A simultaneously receives the LW$_2$ content. This operation allows the parallel transfer of operator in the label image without changing its shape, as shown in FIG. 13B. That is, as can be seen from this operation, the label memory capacity can be reduced to one scanning line as compared with that of the conventional labelling process in which the label memory size must correspond to the binary image and the memory capacity must be 1 bits deep, hence the memory configuration is remarkably simplified. Referring to FIG. 9, FIG. 13A, and FIG. 13B, if a new label assignment takes place as a result of the labelling operation, the new label counter of the new label generate circuit 23 is incremented by the new label generate signal 21. The characteristic information can be stored at an address corresponding to that label number by using the new label content 32 as the address signal of an attribute memory 41 at the same time when the label content 32 is written in the Lf register 54. For this purpose, the address information items x and y are stored as TOP.X and TOP.Y, respectively, and the content of the register LW$_1$ is stored as a high-order label indicating the nesting relationships between labels as depicted in FIGS. 9, 13A, and 13B.

Figure 14A:
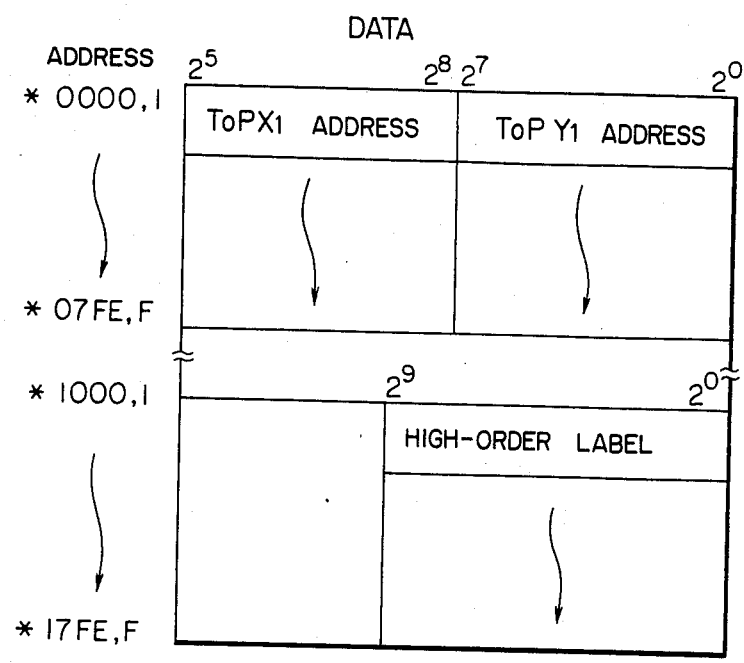
FIG. 14A and FIG. 14B are schematic diagrams depicting the data storing method and a circuit configuration, respectively of the label attribute memory of FIG. 9.
Figure 14B:
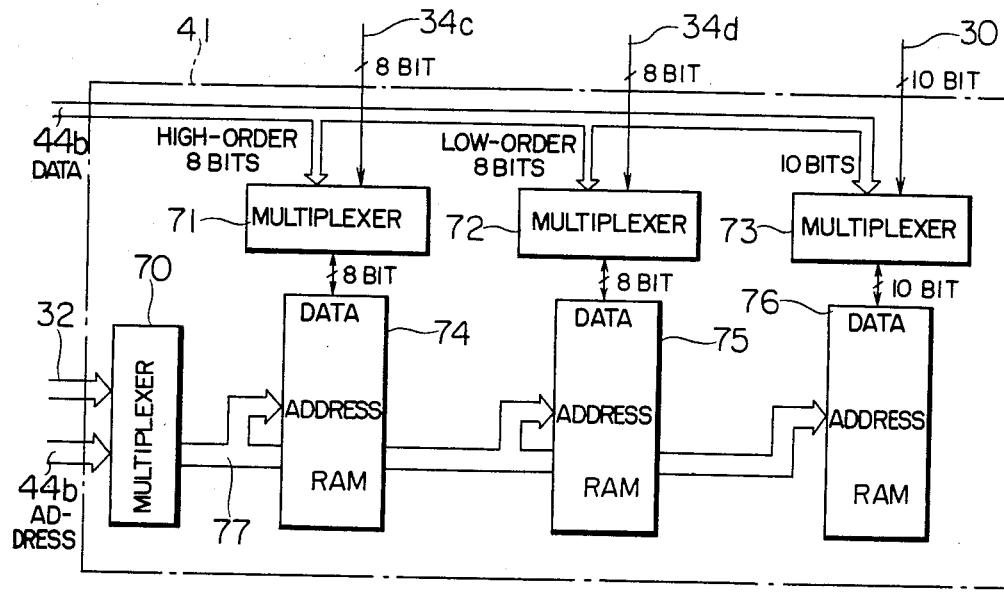

The data storing method and circuit configuration of the attribute memory 41 when utilizing a 16-bit microcomputer will be described by referring to FIG. 14A and FIG. 14B. An addressing space of the CPU 45 is provided to allocate data thereto. As depicted in FIG. 14A, TOP.X and TOP.Y each consisting of eight bits are stored in the address range from $0000 to $07FF and the high-order label data (10-bit data) is stored in the address range from $1000 to $17FF so as to facilitate the circuit configuration in a manner such that the high-order label data is located at an address corresponding to the associated TOP coordinates. This provision allows the circuit configuration of a multiplexer 70 for multiplexing the address lines and the addressing thereof to be simplified as shown in FIG. 14B. Next, the circuit configuration of the attribute memory 41 for storing the data of FIG. 14A will be described. During a labelling operation, a TOP.X data 34C is stored in a memory circuit (RAM) 74 by use of a multiplexer 71 which enables the change-over operation between the line of TOP.X data 34C and a data bus 44$b$ from the CPU 45. Similarly, the TOP.Y and high-order label data are stored in the memory circuits 75 and 76 through multiplexers 72 and 73 constructed in the similar configuration. In this case, the addressing and write control are performed to store the data by use of the new label data 32. Consequently, the memory configuration of FIG. 14A can be utilized when the CPU 45 reads the data.

When a label confluence takes place, the label confluence signal 54 is inputted to a label confluence counter 53 so as to count the number of label confluence occurrences. At the same time, the count of the counter can be used as an address 42 of a confluence pair memory 43 in order to store labels LW$_2$ and Lx formed as a pair in the memory 43.

Figure 15A:
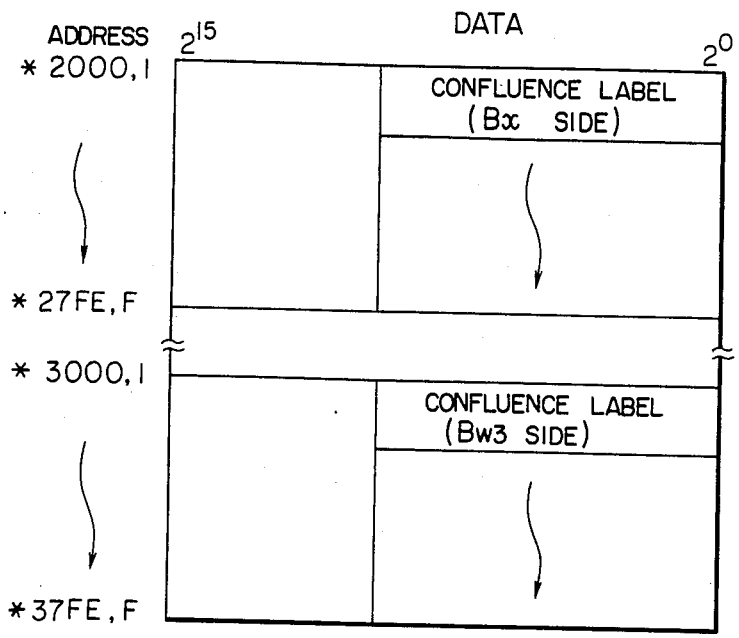
FIG. 15A and FIG. 15B are diagrams illustrating the data storing method and a circuit configuration, respectively of the confluence pair memory of FIG. 7.
Figure 15B:
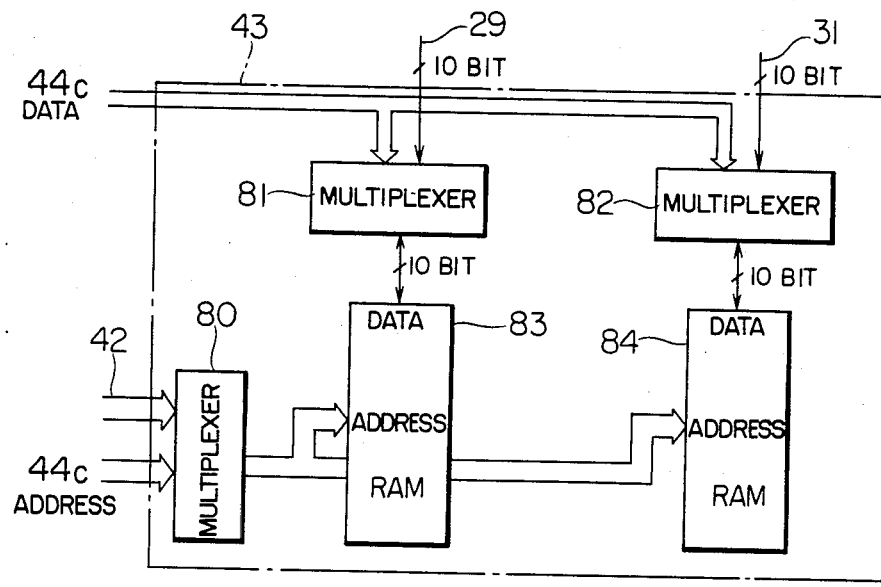

The data storing method and circuit configuration of the confluence pair memory 43 will be described by referring to FIG. 15. A priority circuit may also be used. Like the attribute memory 41, the data is allocated in the addressing space of the CPU 45. As depicted in FIG. 15A, one of each paired confluence label data is stored in the address range from $2000 to $27FF and the other label data thereof is stored in the address range from $3000 to $37FF. Like the attribute memory, the data addresses of the corresponding label data items are relatively associated to each other only to simplify the circuit configuration. In this regard, the data write operation is enabled no matter how such relative addresses are assigned. As illustrated in FIG. 15B, the circuit configuration can be basically the same as that of the attribute memory 41. That is, the confluence label data is stored in the memory circuits (RAM's) 83 and 84 via multiplexers 80, 81, and 82 which allows the input to be changed over between the address and data from the CPU 45. The relationships represented by expression (2) can be readily established by storing the confluence label pairs in this manner.

Figure 16:
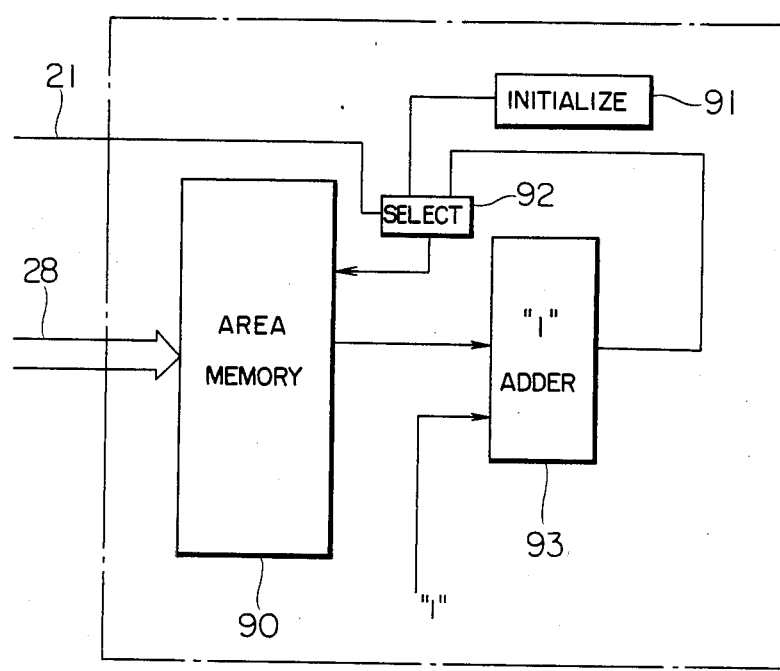
FIG. 16 is a block diagram showing an example of the area detect circuit of FIG. 9.

Next, the area detection during the labelling operation will be described by referring to FIGS. 9 and 16. As illustrated in FIG. 9, only a label information 28 need be supplied as an input signal to a label area detect circuit 39 because of the following reasons. The label information is used as an address of an area memory 90, and if the signal 21 defined as a new label is inputted, an initialize data 91 is changed over by a selector 92 and is written at an address indicated by the label. In an ordinary case, when a label is inputted as an address, a data read is performed on the memory 90 at the same time and an adder 93 adds one to the data, then the resultant data is written at the same address. The label area before the label integration can be obtained through this operation. The final label area can be detected by the integrate processing.

In accordance with a segmentation apparatus 40 having above-mentioned hardware configuration, a real-time processing can be executed to label image components, to store the label confluence information, and to detect the high-order labels, top coordinates, and an area of each label during a period of time for scanning a screen. The integrated final information can be recognized by processing these characteristic data items through the software executed on the CPU 45.

Accordingly, a high-speed segmentation processing can be implemented in a simplified hardware configuration as compared with the conventional system.

In accordance with the present invention, the segmentation processing for the pattern recognition can be performed by use of a simple hardware configuration in which the labelling operation, the detection of the number of labels, the recognition of the nesting relationships between image components, and the detection of image top coordinates and area can be done at a high speed while scanning a screen, hence the pattern recognition time is considerably reduced and the image processing system size can be minimized, thereby allowing the segmentation processing for which a low-price apparatus cannot be provided by the prior art technology to be practically realized.

Figure 17:
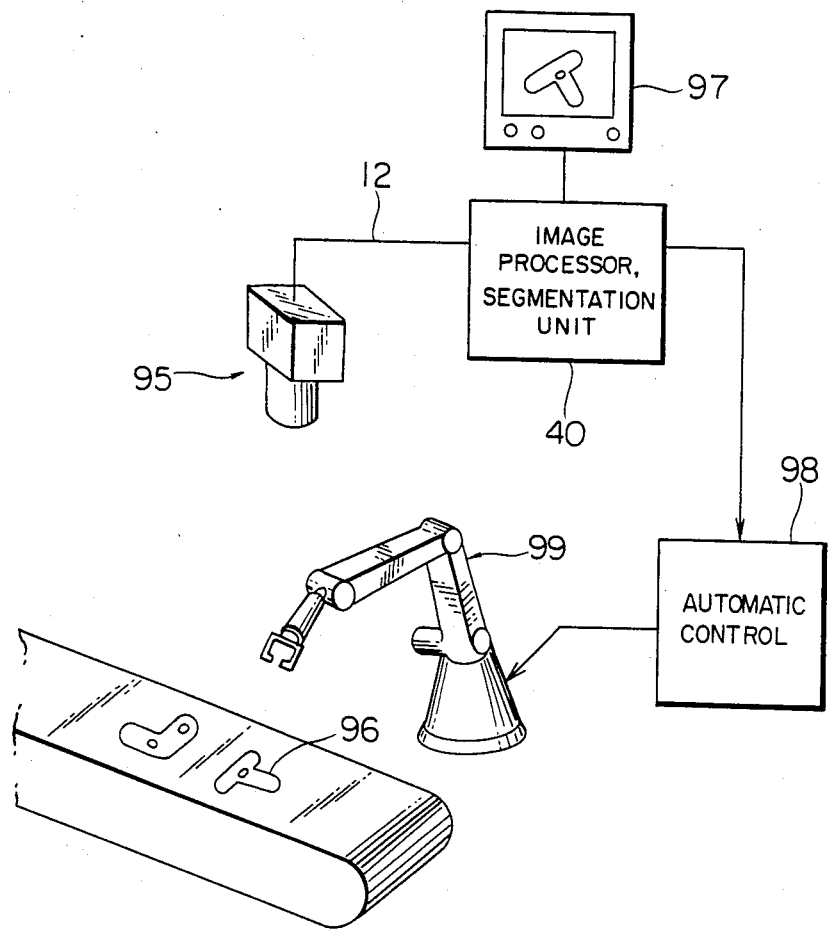
FIG. 17 is a schematic view of an automated system.

FIG. 17 shows an automated system utilizing a segmentation apparatus as described hereinabove. An industrial camera or imaging device 95 views parts 96 carried on a belt conveyer and sends out a video signal 12 to an image processor 40 containing a segmentation unit. The image taken by the camera 95 is shown on a display 97 such as a CRT. The image processor unit 40 scans the image, recognizes various characteristics or parameters of the pictured image components and identifies a desired parts 96. Simultaneously, the position and direction of the parts 96 are recognized. Those image data are sent to an automatic control circuit 98 which then supplies control signals to a robot 99. Based on the received control signal, the robot 99, for example picks up a desired parts 96 and places it at a predetermined position to perform assembly operation. Similarly, further assembling operation such as bolt-screwing and/or machining such as cutting, welding, bending can be done based on the visual recognition results.

While the present invention has been described with reference to the particular illustrative embodiment, it is not restricted by the embodiment but only by the appended claims. It is also to be appreciated that those skilled in the art can change or modify the embodiment without departing from the scope and spirit of the present invention.

We claim:

1. A segmentation apparatus in an image processing system for recognizing a pattern in an image input as a binary signal having two logics and which is obtained by converting an electric signal having image information or input as the binary signal once stored in store means, comprising:

binary image separate circuit means for separating an m by n pixel image from the binary signal obtained by converting the electric signal immediately after the input thereof or from the stored binary signal and for outputting all the logic values of the m by n pixels;

area assign memory circuit means for discriminating a portion of an area having an aritrary shape in the input image to be subjected to a recognition processing from a portion thereof not to be subjected to the recognition processing;

mask image separate circuit means for conducting a local separate operation on an area assign signal read from said area assign memory circuit means to provide a mask signal by sustaining an image size and a positional relationship each identical to that of the binary signal, respectively and for outputting logical values of the m by n pixels;

encode circuit means for outputting:

a first signal code indicating which set of pixels in the vicinity of the binary pixel data separated is identical to an objective pixel;

a second signal code indicating a set of pixels completely different from the objective pixel; and a third signal code indicating that the objective pixel overlaps with a set of pixels and that these overlapped pixels must be integrated;

label data extract circuit means for determining whether the object pixel is either identical to a set of images already specified or is a new set, or the sets must be integrated based on the signal code outputted from said encode circuit means and for extracting label data items already determined and $m \times n - 2$ in number for the objective pixel like said binary image separate circuit so as to label a set obtained;

selector circuit means for assigning each label data obtained from new label generate circuit means outputting new label data to the objective pixel in accordance with a labelling code from said encode circuit means based on a new label generate code outputted from said encode circuit means;

image address generate circuit means for enabling all said circuit means in synchronism with each other according to an image address;

label attribute memory circuit means for storing therein, when a labelled pixel is a new label, a vertex coordinate address of the pixel and a high-order label for a high-order pixel placed at a position exactly above thereof in a preceding scanning line;

detect circuit means for counting the number of label data items appearing in each label subjected to a labelling operation and for detecting an area of each label; and store circuit means for storing therein label data of the items to be integrated in accordance with a signal code indicating a label integration and which is outputted from said encode circuit means;

characterized by that when the image signals inputted complete scanning a screen, a labelling operation is simultaneously conducted with an m by n pixel separation being executed as the primary processing so as to realize the labelling operation, the detection of the label area, label integration relationships, and label vertex coordinates, and the recognition of the label inclusion/exclusion relationships.

2. A segmentation apparatus according to claim 1 wherein said encode circuit means is disposed with buffer memory circuit means for which the logical values from the binary image separate circuit means and the mask signal from the separate logical means are utilized as an address signal so as to generate a labelling code and providing a code to be determined in accordance with the inputted pattern content stored in advance and a labelling code at the same time when a separate pattern is obtained.

3. A segmentation apparatus according to claim 1 wherein said label extract circuit means;
- addresses the determined label in accordance with an X address of the image so as to extract labels whose number is represented by $(m \times n - 1)$;
- reads another label determined by use of the same X address in the preceding scanning line immediately before the label determined by buffer memory circuit means each being 1 bits deep and each having a memory capacity of one scanning line and a register storing a label determined by processing a pixel preceding the objective pixel, and
- sequentially shifts and stores the read data by use of an N-stage shift register, thereby outputting label data items N in number in the preceding scanning line, whereby a selector circuit is enabled to select one item from the output data items N in number based on the labelling data from said encode circuit means.

4. A segmentation apparatus according to claim 1 wherein said label attribute memory circuit means is so configured that characteristic data can be written therein by using as an address the label data from said new label generate circuit means, thereby allowing X and Y addresses and label data associated with a high-order address to be written therein each time a new label is generated.

5. A segmentation apparatus according to claim 1 wherein said label area detect circuit means comprises:
- memory circuit means for which label data is utilized as an address thereof; and
- adder circuit means for reading the content associated with an address indicated by a label each time a label data is inputted and for adding one to the value of the content, whereby the calculated result is written again in said memory circuit means, and when a label is inputted as a new label data, an item of initial data is selected and written in said memory circuit means.

* * * * *